United States Patent
Liu et al.

(10) Patent No.: US 11,532,327 B2
(45) Date of Patent: Dec. 20, 2022

(54) READER FLY HEIGHT CONTROL FOR HEAD BURNISHING MITIGATION

(71) Applicant: Seagate Technology LLC, Fremont, CA (US)

(72) Inventors: Xiong Liu, Singapore (SG); Quan Li, Singapore (SG); Li Hong Zhang, Singapore (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 16/861,027

(22) Filed: Apr. 28, 2020

(65) Prior Publication Data
US 2022/0375497 A1 Nov. 24, 2022

(51) Int. Cl.
G11B 5/60 (2006.01)
G11B 20/18 (2006.01)

(52) U.S. Cl.
CPC ............ *G11B 5/6029* (2013.01); *G11B 5/607* (2013.01); *G11B 20/1816* (2013.01); *G11B 20/1833* (2013.01)

(58) Field of Classification Search
None
See application file for complete search history.

(56) References Cited

U.S. PATENT DOCUMENTS

| | | | | |
|---|---|---|---|---|
| 7,440,220 B1 * | 10/2008 | Kang | ..................... | G11B 5/607 360/75 |
| 7,817,372 B2 | 10/2010 | Takahashi | | |
| 8,730,612 B1 * | 5/2014 | Haralson | .............. | G11B 5/6058 360/75 |
| 8,760,779 B2 * | 6/2014 | Johns | .................... | G11B 5/3133 360/31 |
| 9,275,672 B2 * | 3/2016 | Shiroishi | ................ | G11B 13/04 360/31 |
| 9,842,621 B1 * | 12/2017 | Mader | ................ | G11B 20/1816 |
| 10,127,950 B1 * | 11/2018 | Zhang | .................. | G11B 5/3133 360/31 |
| 10,878,844 B1 * | 12/2020 | Tsai | ........................ | G11B 5/607 360/31 |
| 2003/0058559 A1 * | 3/2003 | Brand | .................. | G11B 5/6005 360/31 |
| 2008/0174905 A1 * | 7/2008 | Ueda | ..................... | G11B 19/045 360/77.04 |
| 2009/0141391 A1 * | 6/2009 | Kuramoto | .............. | G11B 5/583 360/75 |
| 2009/0310246 A1 * | 12/2009 | Takahashi | ............ | G11B 5/6005 360/75 |
| 2011/0007416 A1 * | 1/2011 | Kuramoto | ............ | G11B 5/6029 360/75 |
| 2011/0013305 A1 * | 1/2011 | Ehrlich | ................ | G11B 5/6005 360/31 |

(Continued)

*Primary Examiner* — Andrew L Sniezek
(74) *Attorney, Agent, or Firm* — Holzer Patel Drennan (57) ABSTRACT

A storage device includes a controller that determines a degree of data degradation for a data track targeted by a pending read command and sets a head/media clearance parameter for execution of the read command based on the determined degree of data degradation for the data track, the head/media clearance parameter providing for a greater head-media separation when the determined level of degradation is lower than when the determined level of degradation is higher.

12 Claims, 7 Drawing Sheets

(56) References Cited

U.S. PATENT DOCUMENTS

2011/0102933 A1* 5/2011 Kurita .................. G11B 5/6029
360/75
2017/0133047 A1* 5/2017 Yoon ....................... G11B 5/607
2019/0287559 A1* 9/2019 Aoyagi ................ G11B 5/4886

* cited by examiner

READER FLY HEIGHT CONTROL FOR HEAD BURNISHING MITIGATION

BACKGROUND

In magnetic recording devices, reducing the clearance between the recording (read/write) head elements and the disk has become a key enabler for increased areal density capacity. However, this reduced clearance contributes to an overall increase in unintentional contact between the recording head and the disk. This contact is referred to in the industry as "head burnishing."

Repeated instances of head burnishing greatly increase the failure rate of hard disk drives (HDDs). In particular, head burnishing often causes failures of the read element, such as due to MR resistance degradation, structural change in in SAF/AFM materials, and switches in magnetic polarization of reader elements that lead to a sharp increase in bit error rate (BER). It is known that maintaining a sufficiently high clearance between the read element and disk surface can prevent these types of reader failures. However, bit error rate is known to worsen in proportion to increased reader clearance, ultimately limiting areal density capacity in high clearance designs.

SUMMARY

Implementations disclosed herein provide for a storage device controller that determines a degree of data degradation on a data track and that sets a head/media clearance parameter for a read operation of the data track based on the determined degree of data degradation on the data track. The head/media clearance parameter provides for a greater head-media clearance when the determined level of degradation is lower than when the determined level of degradation is higher.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

DETAILED DESCRIPTION

In magnetic recording devices, adjacent track interference (ATI) is encountered when a target data track on a magnetic recording medium is written a large number of times without adjacent tracks being written to. Over time, data writes to the target data track may degrade or corrupt data on the adjacent tracks. Another phenomena known as sidetrack erasure (STE) can, in certain types of storage devices, similarly affect nearby data tracks that are not necessarily immediately adjacent to the track being updated. The effect of STE is prevalent in a variety of types of storage devices, but does not exist in heat-assisted magnetic recording (HAMR) devices.

Modern devices utilize a number of mechanisms to mitigate data degradation due to ATI and/or STE including, for example, utilization of write counters that trigger periodic read scans and/or data re-writes to fix corrupted data before it becomes irreparably damaged.

The herein disclosed technology provides for optimized selection of a head/media clearance parameter to set a close point (e.g., a fly height) for reader performing a read operation based on a relative degree of degradation (e.g., ATI/STE) on a target data track being read by the read operation. As used herein, the term "head/media clearance" refers to a separation between the recording head and disk while the recording head is flying above the disk surface, such as during a read or write operation. The term "head/media clearance parameter" is used herein to refer to a read or write setting that, when altered, has the effect of changing the head/media clearance. For example, the head/media clearance may be affected by altering current provided to a recording heat heater that controls a head/media close point.

In general, increasing head/media clearance tends to decrease instances of head burnishing. However, it is known that increased head/media clearance can also have the effect of increasing the bit error rate during read and write operations. The herein disclosed technology leverages information tracked and provided by track degradation monitoring and maintenance systems to inform the selection of head/media clearance for a read operation. When degradation of a target data track is low (e.g., low ATI/STE), the reader head fly height may be set so as to provide a greater head/media clearance without suffering a corresponding increase in readback BER. Conversely, when degradation of the target data track is comparatively high (e.g., high ATI/STE), the readback BER tends to increase. The presently-discloses systems are therefore configured to reduce the head/media clearance when reading data from more moderately or significantly degraded tracks to ensure there is no drop in device performance relative to reads at higher head/media clearance from the comparatively lower degradation data tracks. Overall, this tradeoff maximizes the average head/media clearance for a device while guaranteeing that device performance satisfies predefined performance metric (e.g., e.g., a maximum acceptable BER).

Figure 1:
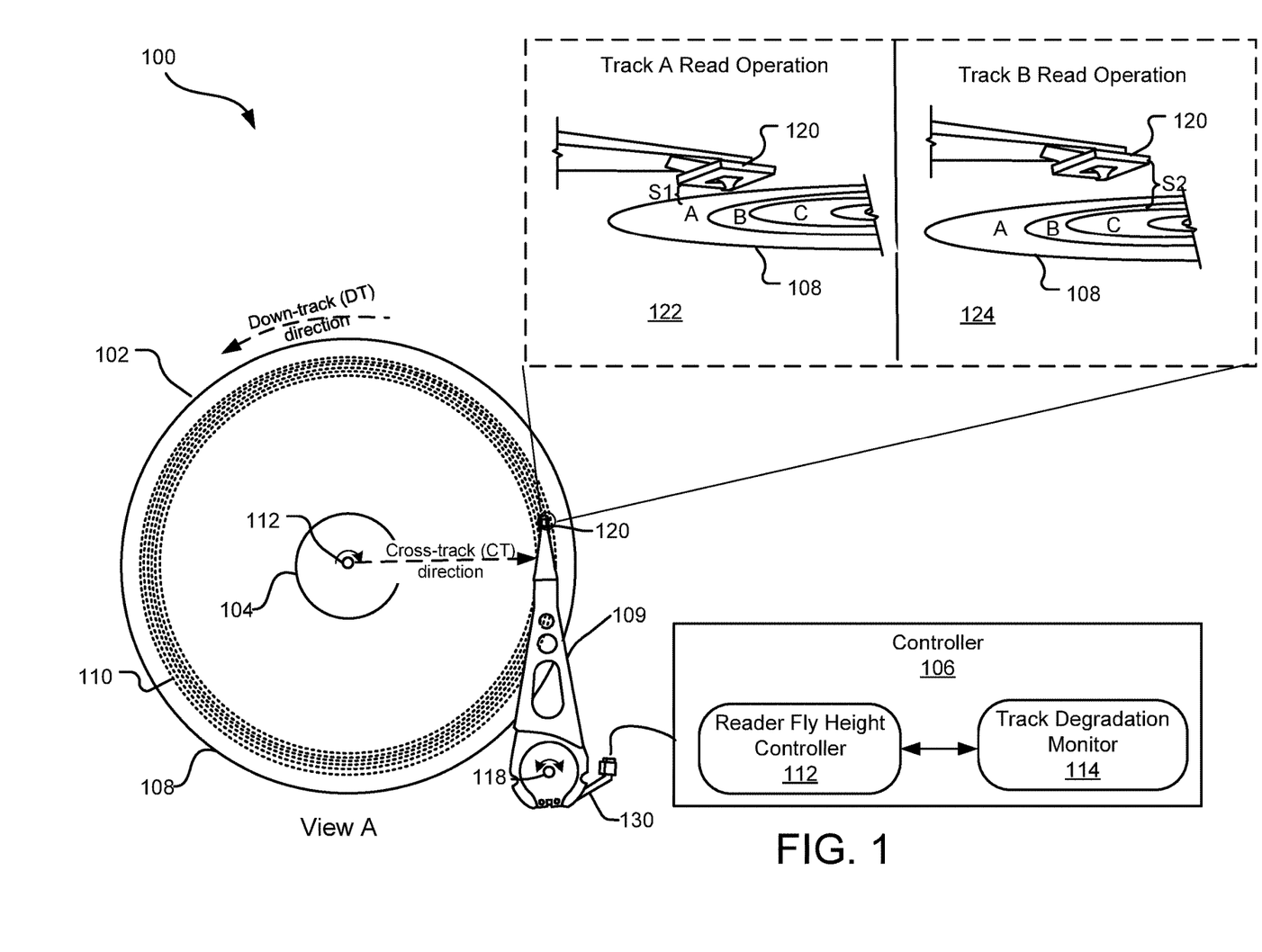
FIG. 1 illustrates an example data storage device including a head assembly for writing data on a magnetic storage medium.

FIG. 1 illustrates a data storage device 100 including a head assembly 120 for writing data on a magnetic storage medium 108. Although other implementations are contemplated, the magnetic storage medium 108 is, in FIG. 1, a magnetic storage disc on which data bits can be recorded using a magnetic write pole and from which data bits can be read using a magnetoresistive element (not shown). As illustrated in View A, the magnetic storage medium 108 rotates about a spindle center or a disc axis of rotation 112 during rotation, and includes an inner diameter 104 (i.e., the "ID") and an outer diameter 102 (i.e., the "OD") between which are a number of concentric data tracks 110. Information may be written to and read from data bit locations in the data tracks on the magnetic storage medium 108.

The head assembly 120 is mounted on an actuator assembly 109 at an end distal to an actuator axis of rotation 118. The head assembly 120 flies in close proximity above the surface of the magnetic storage medium 108 during disc rotation. The actuator assembly 109 rotates during a seek operation about the actuator axis of rotation 118. The seek operation positions the head assembly 120 over the target data track (e.g., the data tracks 110) for read and write operations.

The head assembly 120 includes at least one write element (not shown) that further includes a write pole for converting a series of electrical pulses sent from a storage device controller 106 into a series of magnetic pulses of commensurate magnitude and length. The magnetic pulses of the write pole selectively magnetize magnetic grains of the rotating magnetic storage medium 108 as they pass below the pulsating write element.

The storage device controller 106 implements write commands and controls positioning of the head assembly 120. The storage device controller 106 includes software and/or hardware, and may be implemented in any tangible computer-readable storage media within or communicatively coupled to the data storage device 100. As used herein, the term "tangible computer-readable storage media" includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by mobile device or computer. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal.

In FIG. 1, the storage device controller 106 is shown to include both a reader fly height controller 112 and a track degradation monitor 114. In one implementation, the track degradation monitor 114 continuously monitors a degree of detectable data degradation of each track on the magnetic storage medium 108 during nominal storage device operations. For example, the track degradation monitor 114 may regularly read back data tracks or data segments to measure degradation of the stored data that is due to ATI and/or STE. This type of degradation measurement is referred to herein as a Direct Offline Scan (DOS).

In one implementation, the track degradation monitor 114 initiates a DOS of a data track after a particular number of data writes to an immediately adjacent or nearby data track. During the DOS, data is read back from a data track on magnetic storage medium 108. The track degradation monitor 114 uses an error correction code (ECC) to repair errors in the data to the extent possible and uses the ECC to count a number of correctable read errors. If the number of correctable read errors exceeds a threshold, the track degradation monitor 114 may elect to re-write the data of that data track before the data degradation becomes more severe. Although specific data degradation monitoring and corrective systems may vary from one implementation to another, one exemplary methodology is discussed below with respect to FIG. 2.

In the presently disclosed system, the track degradation monitor 114 determines a current degree of degradation for a target data track responsive to receipt of a read command from a host device (not shown) that is directed to the target data track. The track degradation monitor 114 provides this information to the reader fly height controller 112 which, in turn, uses the information to actively adjust a head/media clearance parameter to control fly height of a read element (not shown) during execution of the read command.

As shown in detail via exemplary expanded views 122 and 124, the reader fly height controller 112 selectively varies a separation (S1, S2) between the head assembly 120 and the magnetic storage media 108 depending on the degree of degradation on the target data track that is being read by the read operation. By example and without limitation, view 122 illustrates the head 120 positioned with a first head/clearance separation S1 for a data access operation of track A. View 124, in contrast, illustrates the head assembly 120 positioned with a second head/clearance separation S2 for a data access operation of track B. In this example, S2 is shown (exaggerated for clarity of concept) to be larger than S1. This may, for example, be the case when the track degradation monitor 114 determines that the level of ATI on track B is low (e.g., there is little to no data degradation) in comparison to the level of ATI on track A. In this case, the separation S1 is smaller than the corresponding separation S2.

Figure 2:
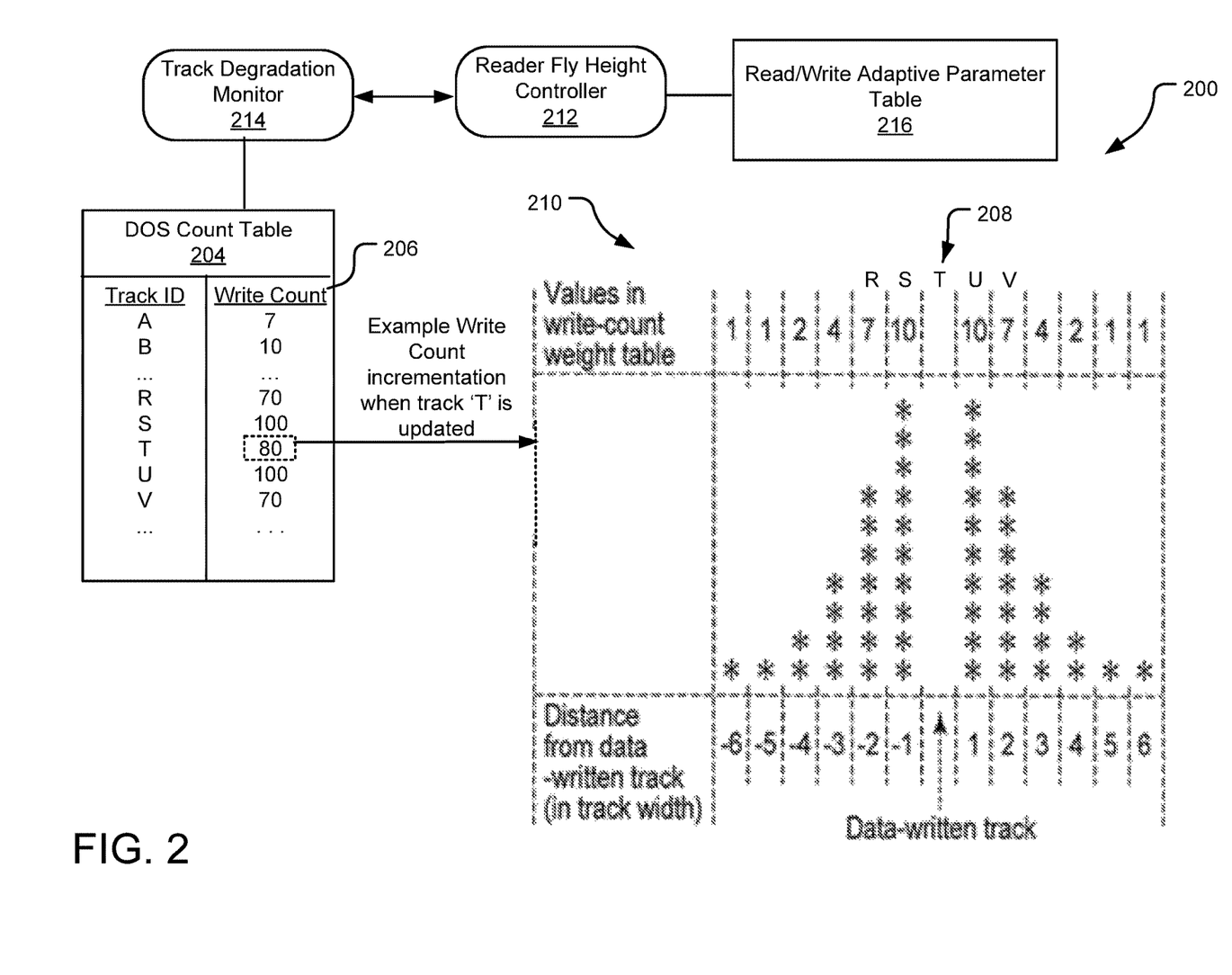
FIG. 2 illustrates aspects of a storage system that tracks and actively corrects data track degradation information usable to inform selection of head/media clearance parameters.

FIG. 2 illustrates aspects of a storage system 200 that tracks data track degradation information usable to inform selection of head/media clearance parameters. Specifically, the illustrated a storage system 200 monitors and, at times, corrects data degradation due to phenomena such as adjacent track erasure (ATI) and/or STE. To track and repair data degradation, a track degradation monitor 214 (e.g., the same or similar to the track degradation monitor 114 of FIG. 1) keeps a write counter in association with some or all data tracks on the magnetic storage medium.

By example and without limitation, the track degradation monitor 214 of FIG. 2 maintains a DOS count table 204 that stores count values 206 (also referred to herein as DOS count values). The count values 206 increase in proportion to severity of data degradation on the corresponding data track. A write operation to any particular data track increments a number of write counters associated with nearby (e.g., immediately adjacent) data tracks. In FIG. 2, this write counter incrementation is achieved by scaling an entire affected region (e.g., more than just immediately adjacent tracks) by a scalar value to obtain a new increment write count.

For example, a diagram 210 illustrates an example incrementation of the write counters for various data tracks responsive to a data write to a central data track 208, annotated as track "T" in the top margin of the diagram and also in the DOS count table 204. Since the data tracks closest to the central data track 208 (T) are at a highest risk of ATI and STE, the write counter for each of these data tracks (e.g., tracks R, S, U, V) increments in proportion to a distance from the central data track 208 where the data is written. For example, write counters for the data tracks immediately adjacent to the central data track 208 increment by 10; write counters for the data tracks two tracks away from the central data track 208 increment by 7; write counters for the data tracks three tracks away from the central data track 208 increment by 4, etc.

Other implementations of the track degradation monitor 214 may implement write count scaling techniques different from that illustrated by FIG. 2. In one implementation, a data write to a particular data track increments write counters associated with 100 adjacent tracks (e.g., −50 tracks and +50 tracks from the central data track 208). When the write counter for any particular data track exceeds a predetermined threshold, that data track is subjected to a DOS.

Responsive to receipt of a host-initiated read command of a target data track, the track degradation monitor 214 accesses the DOS count table 204 to retrieve a current write counter value of the target track. Notably, this write count value is directly indicative of the degree of data degradation of the data track due to ATI/STE; therefore, the write count (or DOS count) value shown in DOS count table 204 is referred to throughout the following description as a "track degradation indicator." While DOS count values represent one possible track degradation indicator usable to select reader fly height, it is contemplated that other track degradation indicators may also be suitable for such purpose in other implementations.

In FIG. 2, the track degradation monitor 214 provides the track degradation indicator (e.g., write count value) of the target data track to a reader fly height controller 212 which, in turn, accesses a read/write adaptive parameter table 216 and uses the track degradation parameter of the target data track to retrieve a corresponding head/media clearance parameter. In one implementation, the head/media clearance parameter specifies an adjustment to a read heater setpoint that can be implemented to maximize the head/media separation during the read operation while still guaranteeing device performance in compliance with a predefined threshold (e.g., readback BER at or below a threshold).

The read/write adaptive parameter table 216 stores, for each different recording head in the system and each track or region of the media, a range of write counter (DOS Count) values each being associated in the table with a predefined, corresponding head/media clearance parameter. In at least one implementation, the read/write adaptive parameter table 216 stores zone-specific head/media clearance parameters. For example, the read/write adaptive parameter table 216 may store write counter values and corresponding head/media clearance parameters for each recording head in each of multiple different radial zones (e.g., inner diameter zone, middle diameter zone, outer diameter zone) of the media. In this case, the reader fly height controller 212 may selectively adjust a reader heater setpoint by a first amount when positioning a recording head to read data from an outer diameter data track while selectively adjusting the reader heater setpoint by a second different amount when reading from an inner diameter track-even if the two tracks have the same degree of data degradation.

According to one implementation, the read/write adaptive parameter table 216 is populated with values during a factory calibration process. For a single data track or radial zone of data tracks, this process (discussed in detail with respect to FIG. 3-5 below) entails at least the following:

(1) determining a first transfer function that defines a change in readback BER as a function of a track degradation indicator (e.g., DOS count value) for a target data track;

(2) determining a second transfer function that defines a head/media clearance parameter as a function of total readback BER, assuming constant (e.g., zero) degradation at each incrementation of the head/media clearance parameter; and (3) using the first transfer function and the second transfer function to populate a table for the data track that provides an association between (A) track degradation indicator values (DOS count values for the track) and (B) corresponding head/media clearance parameters.

Figure 3:
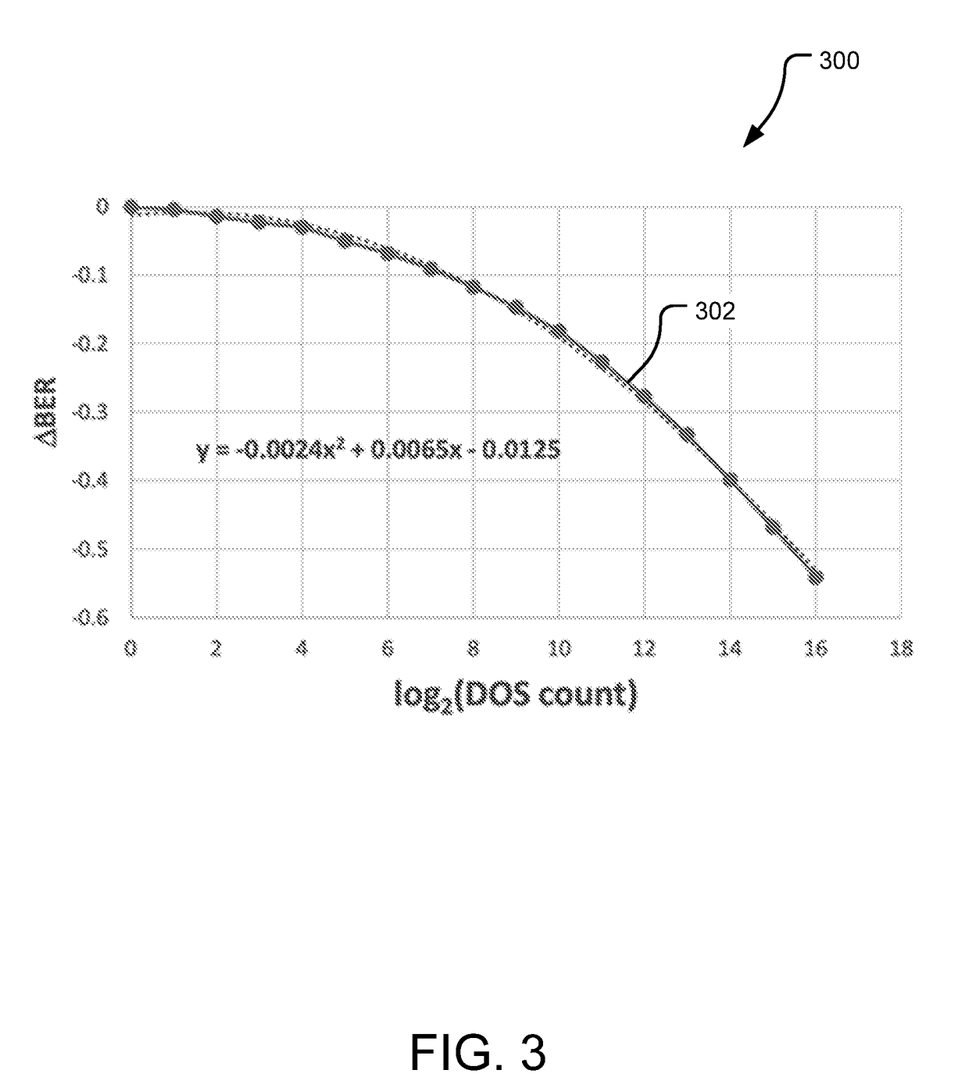
FIG. 3 illustrates an plot of an example transfer function that may be used to compile a look-up table usable to selectively control reader fly height for head burnishing mitigation.

FIG. 3 illustrates an exemplary plot 300 illustrating a transfer function 302 that may be used to compile a look-up table usable to selectively control reader fly height for head burnishing mitigation. According to one implementation, the transfer function 302 is derived during a factory calibration process. The transfer function 302 be separately determined for each recording head in a storage device and/or separately determined for different regions of a magnetic media. For example, the transfer function 302 may be identified for each recording head and each of multiple radial zones (e.g., inner diameter, middle diameter, outer diameter) on a media.

The x-axis of the plot 300 indicates values of a track degradation indictor. In this particular example, the track degradation indicator is "DOS count," which may be understood as referring to the write count value for a given data track, as discussed above with respect to DOS count table 204 in FIG. 2. During the course of nominal storage device operations, a track degradation monitor increments the DOS count value for each track when adjacent tracks are re-written. The DOS count value therefore indicates a general degree of data degradation on the data track as a result of ATI/STE. By example and without limitation, the x-axis of the plot 300 illustrates the binary logarithm of the DOS count. To generate the dataset shown on the plot 300, data is read from a same data track at each incremental level of the DOS count for the data track (e.g., each of multiple different levels of track degradation) and the resulting bit error rate (BER) is measured for the read operation. This process is performed while keeping the head/media separation constant.

The Y-axis of the plot 300 illustrates each incremental change in BER (ABER) relative to a '0' setpoint (shown at the top of the Y-axis). This 0 setpoint represents the BER that is measured when the data track has a DOS count value of 0 (e.g., no degradation at all).

After collecting a dataset similar to that shown in the plot 300, the transfer function 302 (e.g., best fit line) can be fit to the dataset using equations (1) and (2) below:

$$X = \text{Log}_2(DOS \text{ Count}) \quad (1)$$

$$\Delta BER = aX^2 + bX + c \quad (2)$$

The transfer function 302 may be used in combination with a second transfer function, described below with respect to FIGS. 4A and 4B, to correlate each DOS count value of the data track with a corresponding head/media clearance parameter. The head/media clearance parameter serves to maximize head/media clearance during each read operation while still guaranteeing that the device functions in accord with a predefined read performance metric.

Figure 4A:
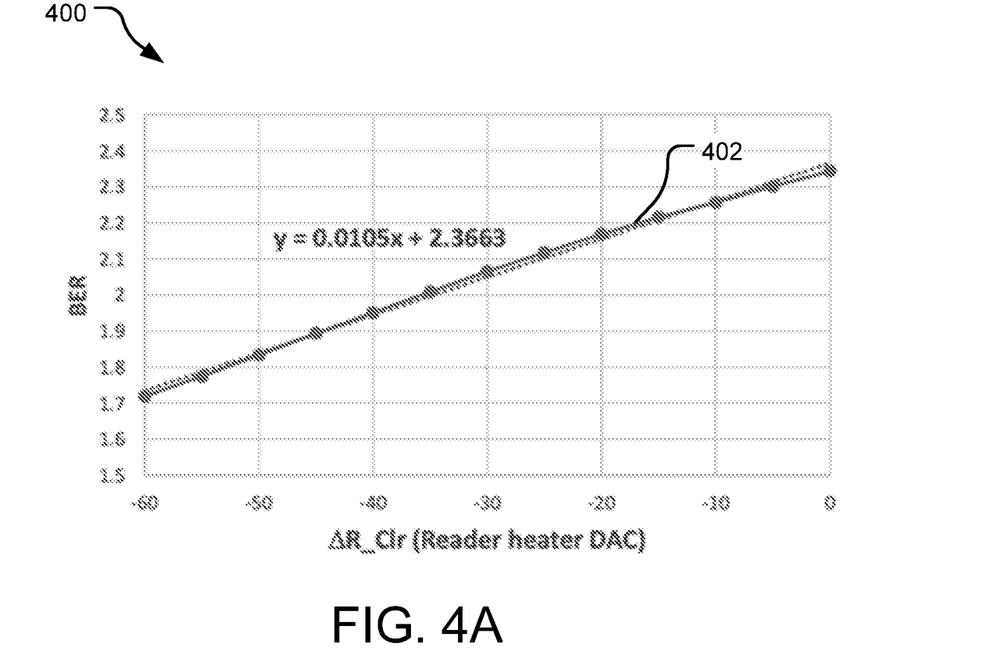
FIG. 4A illustrates a plot of another example function that may be used in compiling a look-up table usable to selectively control reader fly height for head burnishing mitigation.

FIG. 4A illustrates an exemplary plot 400 illustrating another example function 402 that may be in compiling a look-up table usable to selectively control reader fly height for head burnishing mitigation. In one implementation, the function 402 is built for the same recording head and data track (or radial zone of the media) as the transfer function 302 shown in FIG. 3.

The x-axis of the plot 400 ($\Delta R\_Clr$) indicates incremental changes in a reader heater setpoint, which is to be understood as one example reader/media clearance parameter. These incremental heater setpoint changes are shown in units labeled ("Reader Header DAC") representing a quantity of current (e.g., 1 DAC=0.1275 mA). The '0' setpoint on the far right end of the x-axis represents the amount of current that gives a minimum separation of the reader and media to avoid potential head-disk contact. To create the data set shown in plot 400 for a given recording head and data track (or radial zone of tracks on the media), the reader heater current is decreased in increments from the '0' setpoint and readback BER is measured at each different reader current value. Decreasing the reader heater relative to the 0 setpoint has the effect of lifting the reader away from the media. At each incremental decrease in the reader heater current, the target data track is read and the BER recorded. These BER values are shown on the Y-axis of plot 400.

The entire dataset shown in the plot 400 is collected while the degradation on the target data track remains unchanged. For example, the target data track may have a DOS count value of zero at the time each data point is collected.

After collecting the dataset shown in the plot 400, the function 402 (e.g., best fit line) can be fit to the dataset using equation (3) below:

$$BER = k_1 \Delta R_{Clr} + b_1 \quad (3)$$

Figure 4B:
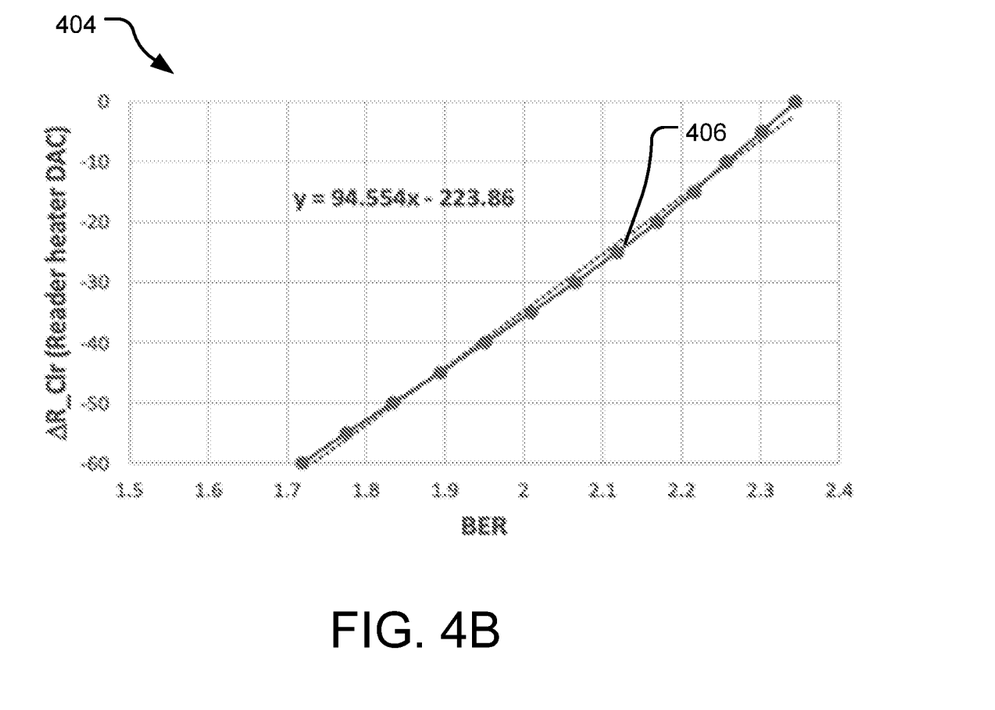
FIG. 4B illustrates a plot of another example transfer function that is created by reversing the x-axis and y-axis shown in FIG. 4A.

FIG. 4B illustrates another plot 404 showing a transfer function 406 that is created by reversing the x-axis and y-axis shown in FIG. 4A. Here, the read/media clearance parameter ($\Delta R_{Clr}$) is a function of the readback BER. A best fit line to this dataset is generally described by equation (4), below.

$$\Delta R_{Clr} = k_2 BER + b_2 \quad (4)$$

When the transfer function 302 of FIG. 3 and the transfer function 406 of FIG. 4B are defined for a same recording head and data track, the two functions are usable in combination to determine a reader/media clearance parameter for the data track. Specifically, these two functions may be used to determine a read/media offset for a read operation based on a current degree of degradation of a target data track.

Figure 5A:
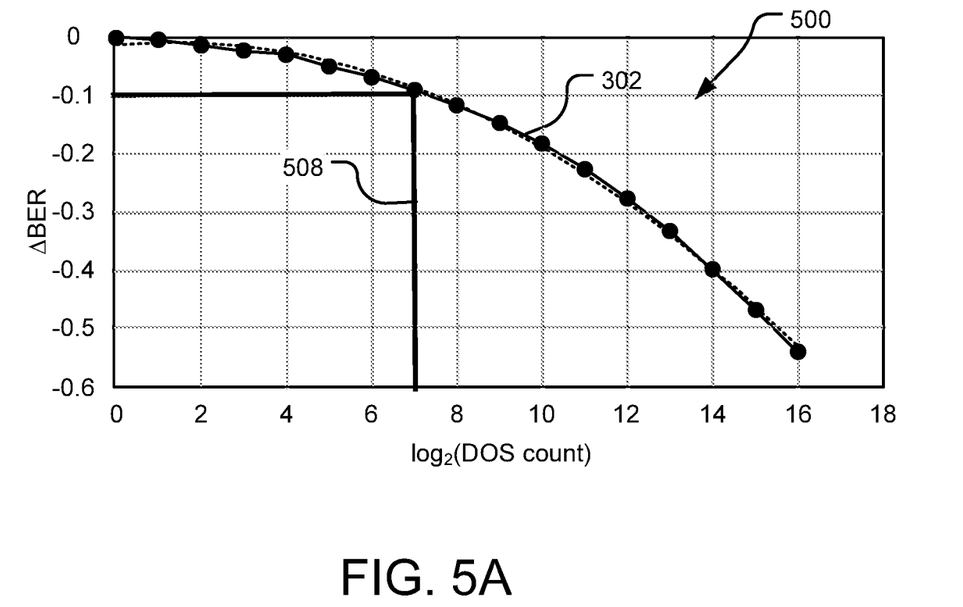
FIG. 5A illustrates a plot of the transfer function of FIG. 3 shown with additional annotations to illustrate a specific example.
Figure 5B:
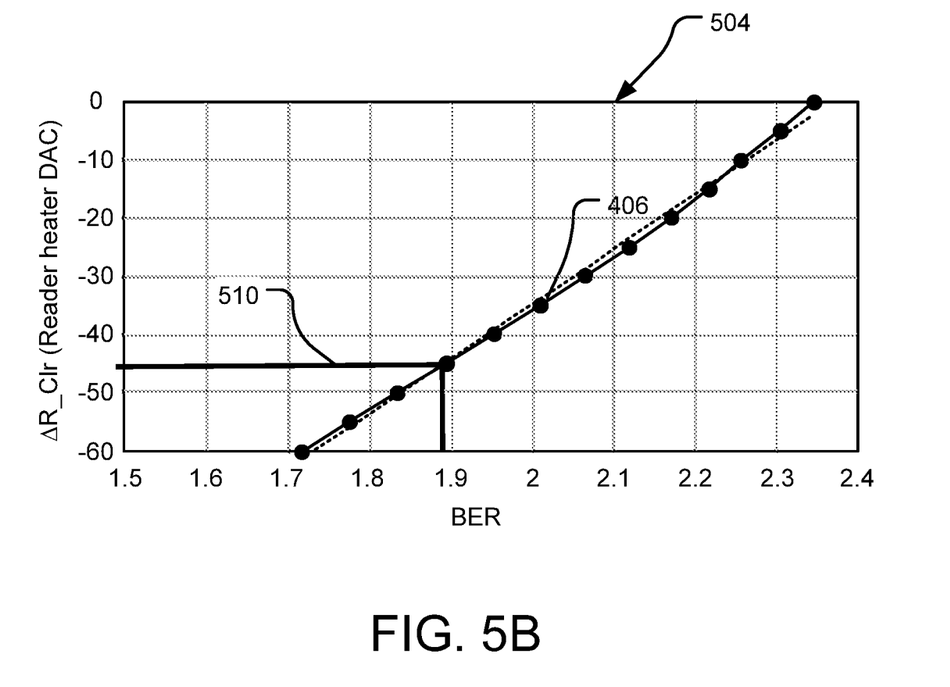
FIG. 5B illustrates a plot illustrating the transfer function of FIG. 4B with additional annotations to further elaborate upon the specific example shown and described with respect to in FIG. 5A.

FIGS. 5A and 5B (the word 'FIG. 5B' is missing in the figure) illustrate an example correlation between a track degradation indicator value (e.g., DOS count) and a head/media clearance parameter that may be realized based on the transfer functions described above with respect to FIGS. 3, 4A, and 4B. Specifically, FIG. 5A illustrates a plot 500 illustrating the transfer function 302 as shown in FIG. 3 with additional annotations to indicate a specific example case.

In the illustrated example, it may be presumed that data from the plot 500 has been compiled into a look-up data. When the storage device receives a read command targeting the data track corresponding to the transfer function 302, the device determines that the data track has a current DOS count value of 128, which corresponds to 7 (e.g., $\log_2(128)=7$). Using the transfer function 302, it can be determined that a DOS count value of 128 correlates with a ABER of 0.1, meaning that it can be assumed that the data readback BER is likely to be 0.1 worse than the BER observed when the DOS count for the data track is 0. In FIGS. 5A and 5B, the scale of BER represents 1 error bit per $10^x$ readback bits, where X is the BER value shown on the plot 500, 504. Thus, if BER is 2 in FIG. 2B, this implies and error rate that provides for one error bit per $10^2$ readback bits.

Provided that the actual readback BER is known for the data track for the DOS count=0 value, a total BER can be assumed, per equation (5) below, where LSL_BER is the "Lower Specification Limit," which represents a lowest limit of allowable BER per a defined performance metric.

$$BER = LSL\_BER + \Delta BER \quad (5)$$

For example, a given device may be designed to ensure a minimum readback BER of 1.8 (LSL_BER=1.8). If the reader clearance and other device parameters are tuned such that the readback BER for the data track is 1.8 when the track has a DOS count of 0, it can be assumed (based on the relationship shown by line 508) that the data track will then experience a total BER of 1.9 (e.g., 1.8+($\Delta BER$=0.1)) when the DOS count is 0 and the reader clearance is set based on DOS count 128. In other words, the data track has BER of 1.8 when the DOS count is 128 since the reader clearance for DOS count 128 is lower than that for DOS count 0.

FIG. 5B illustrates a plot 504 illustrating the transfer function 406 of FIG. 4B with additional annotations to further elaborate upon the example discussed above with respect to FIG. 5A. It may be assumed that some or all of the information shown by the plot 504 is also compiled into the look-up table that the device accesses upon receipt of each read. If, as in the above example, the storage device receives a read command directed to a data track at a time when the data track has a DOS count of 128, the total expected BER at DOS count=0 can be determined as described above (e.g., BER=1.9). Using the transfer function 406, it can then be determined (based on the relationship shown by line 510) that this total BER corresponds to a read/media clearance parameter value of −45 DAC, meaning that the reader heater can be reduced by 45 DAC from the 0 setpoint (e.g., the heater current setpoint that is for the minimum target clearance to prevent potential head-disk contact).

The logic described with respect to the above example allows the reader heater to be set so as to provide a maximum clearance between the reader and the media while still guaranteeing a maximum readback BER that is less than or equal to predetermined threshold (e.g., 1.8 in the example above). This clearance may be determined at the time a read command is received based on the current degradation of the data track targeted by the read command. In one implementation, the above-described transfer functions are used to compile a look-up table, such as the Read/Write Adaptive Parameter table 216 shown and described with respect to FIG. 2. In other implementations, aspects of this translation dynamically computed.

Figure 6:
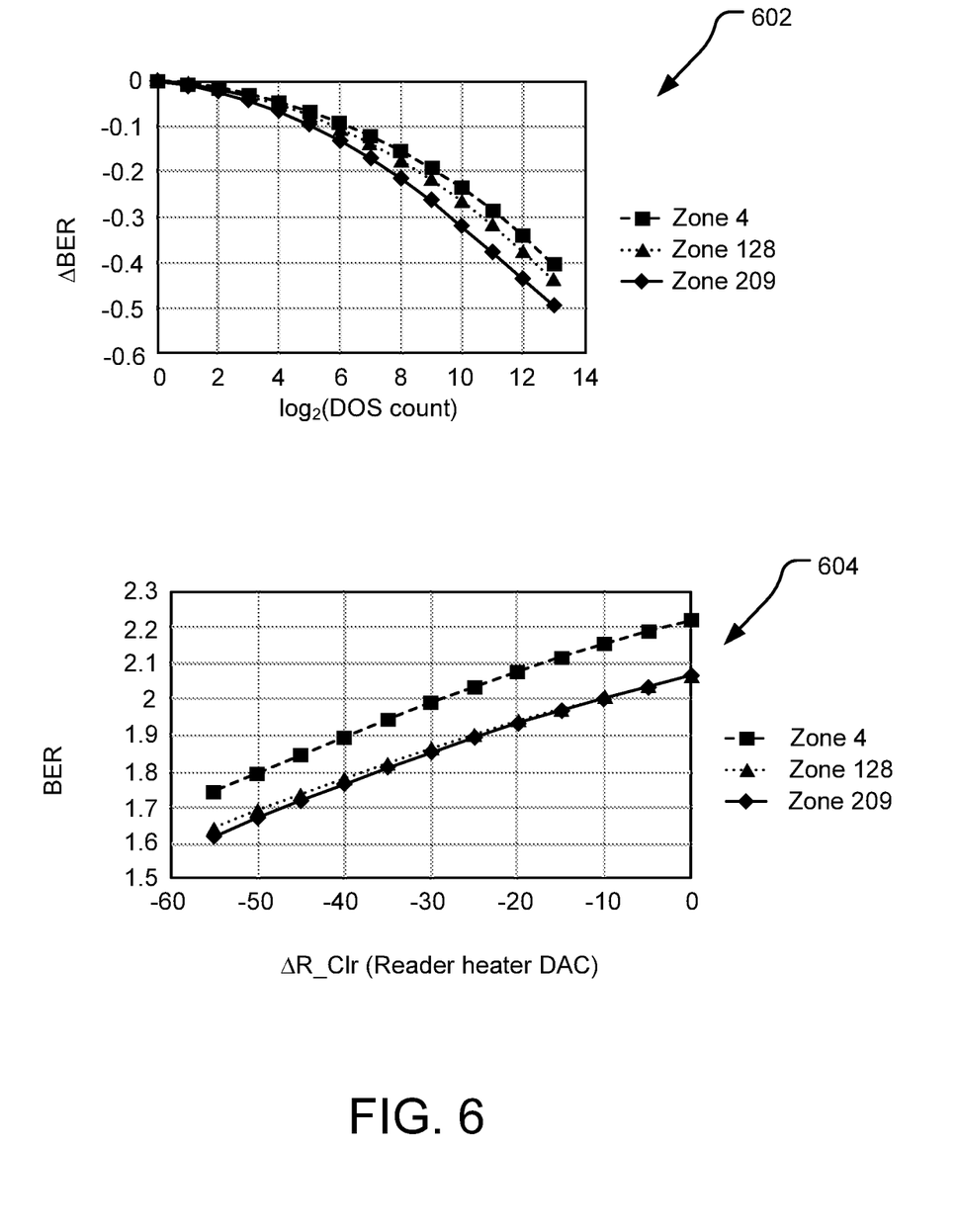
FIG. 6 illustrates plots of exemplary transfer functions defined for a single recording head that are usable to select a head/media clearance parameter that maximizes head/media clearance at any track on a magnetic media while still guaranteeing a readback performance metric.

FIG. 6 illustrates plots 602, 604 illustrating exemplary transfer functions that may defined for a single recording head usable to select a head/media clearance parameter that maximizes head/media clearance at any track on a magnetic media while still guaranteeing a readback performance metric (e.g., readback BER less than a predefined maximum threshold).

The plot 602 illustrates a first transfer function for a read element that maps a track degradation indicator (DOS count) to a corresponding change in readback BER. This function, shown for the same read element in each of three different radial zones of a disk numbered as zone 4, zone 128, and zone 209. These radial zone may, for example, correspond to radial locations at the inner diameter, middle diameter, and outer diameter, respectively.

The plot 604 illustrates a second transfer function for the read element that maps the expected BER (as defined by equation 5 above) to a corresponding head/media clearance parameter. This function, shown for the same read element in each of the same three different radial zones shown in the plot 602, may be determined in a manner the same or similar to that described above with respect to FIG. 4B. In different implementations, the transfer functions may be determined for any number of radial zones. These functions may be computed individually for each different read element in the storage device.

Figure 7:
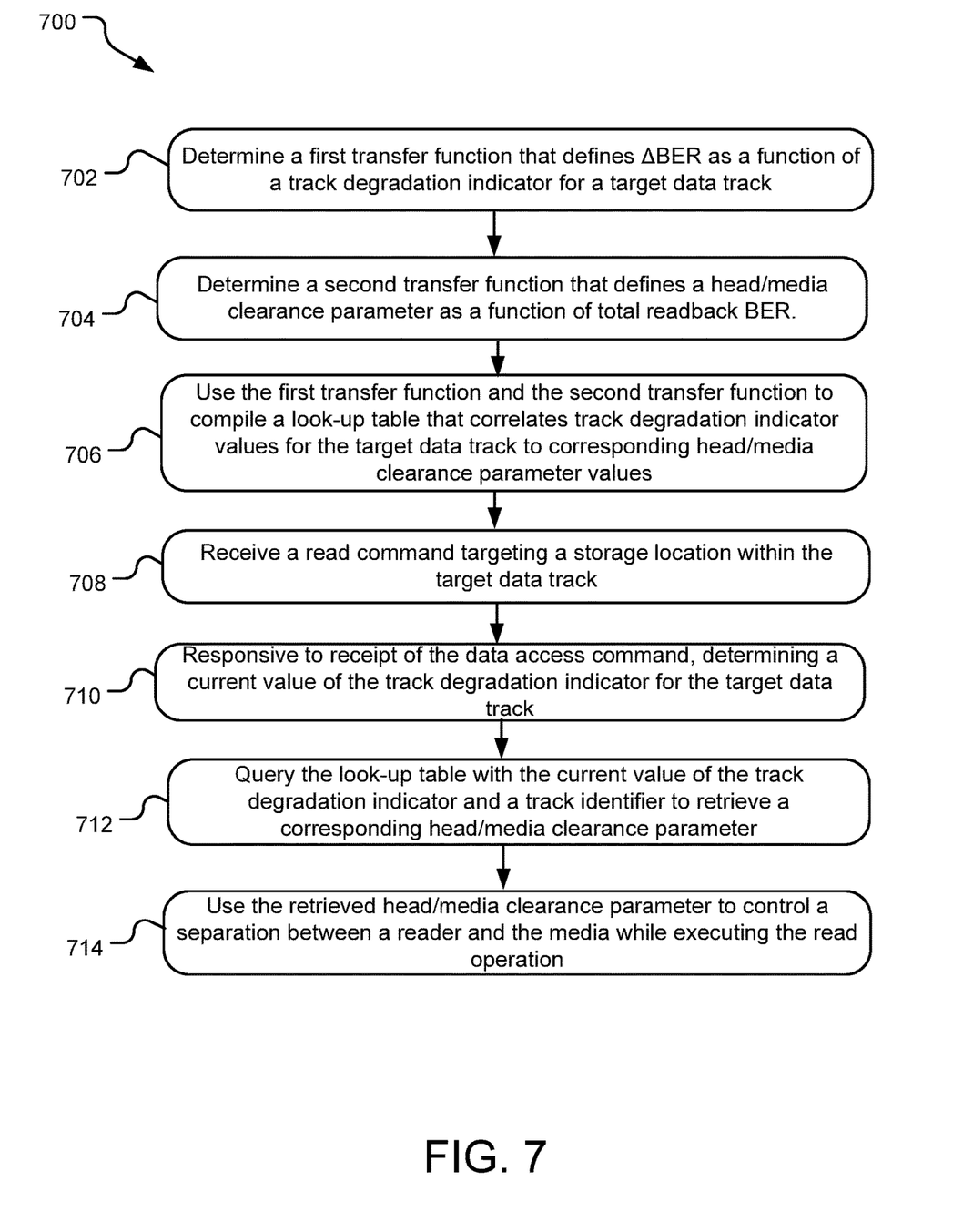
FIG. 7 illustrates example operations for selecting a head/media clearance parameter that maximizes head/media clearance for a read of any data track on a magnetic media while still guaranteeing a readback performance metric.

FIG. 7 illustrates example operations 700 for selecting a head/media clearance parameter that maximizes head/media clearance for a read of any data track on a magnetic media while still guaranteeing a readback performance metric.

A determining operation 702 determines a transfer function that defines a change in readback BER that is observed as a function of a track degradation indicator (e.g., the amount of degradation that the track experiences over time due to ATI/STE). Another determining operation 704 determines a second transfer function that defines a head/media clearance parameter as a function of total readback BER.

A look-up table compilation operation 706 compiles a look-up table based on the transfer function and the second transfer function that is usable look-up a head/media clearance parameter value corresponding to a given track degradation indicator (e.g., DOS count) for the target data track. The head/media clearance parameter values included in the look-up table may be defined specifically for each read element with respect to designated tracks or radial zones of tracks.

In one implementation, the operations 702, 704, and 706 are performed during a factory calibration process for a storage device. During subsequent end-user use of the storage device, a receiving operation 708 receives a read command targeting a storage location within the target data track.

Responsive to the receiving operation 708, a track degradation determination operation 710 determines a current track degradation indicator for the data track. For example, the track degradation indicator may be the current DOS count value for the target data track.

A look-up table query operation 712 queries the look-up table with the track degradation indicator and an identifier for the target data track or associated radial zone to retrieve a corresponding head/media clearance parameter from the look-up table. A control operation 714 uses the retrieved head/media clearance parameter to control a separation between a reader and the media while executing the read operation to the target data track.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
    incrementing a counter for a data track each time an adjacent track is written;
    determining a count value of the counter for the data track, the count value being indicative of a current degree of data degradation on a data track that is due to adjacent track interference (ATI);
    querying a look-up table with the count value to retrieve a head/media clearance parameter; and
    adjusting a fly height setting for a read operation of the data track based on the retrieved head/media clearance parameter, the fly height setting being adjusted to provide greater head-media separation when the current degree of data degradation on the data track is lower than when the current degree of data degradation on the data track is comparatively higher.

2. The method of claim 1, further comprising:
    using the count value of the counter for the data and a radial zone of the data track to retrieve the head/media clearance parameter from the look-up table.

3. The method of claim 1, further comprising generating the look-up table by performing a sequence of operations comprising:
    determining a first transfer function for the data track defining a change in readback bit error rate (BER) as a function of the count value of the counter for the data track
    determining a second transfer function for the data track defining a head/media clearance parameter as a function of readback BER; and
    using the first transfer function and the second transfer function to compile look-up table information for the data track, the look-up table information correlating each of multiple values of the track degradation indicator to a corresponding value of the head/media clearance parameter.

4. The method of claim 3, wherein generating the look-up table further comprises:
    for each of multiple recording heads of a storage device, defining the first transfer function and the second transfer function for with respect to each of multiple different radial zones of a recording media; and
    compile the look-up table information using the defined first transfer functions and the defined second transfer functions.

5. The method of claim 1, wherein the head/media clearance parameter indicates a current input value for a reader heater, the reader heater controlling a close point between a read element and the data track.

6. A storage device comprising:
    a counter configured to increment a count value for a data track each time an adjacent track is written, the count value being indicative of a current degree of data degradation on the data track that is due to adjacent track interference (ATI);

a track degradation monitor configured to determine the count value for the data track; and a reader fly height controller configured to:
query a look-up table with the count value to retrieve a head/media clearance parameter; and
adjust a fly height setting for a read operation of the data track based on the retrieved head/media clearance parameter, the fly height setting being adjusted to provide greater head-media separation when the current degree of data degradation on the data track is lower than when the current degree of degradation on the data track is comparatively higher.

7. The storage device of claim 6, wherein the reader fly height controller is further configured to query the look-up table with a radial zone of the data track.

8. The storage device of claim 6, wherein the look-up table correlates each of a plurality of values of the count value for the data track with a corresponding head/media clearance parameter for the data track, the look-up table being compiled based on:
a first transfer function for the data track defining a change in readback bit error rate (BER) as a function of a track degradation indicator, the track degradation indicator representing a degree of data degradation for data track that is due to adjacent track interference (ATI); and
a second transfer function for the data track defining a head/media clearance parameter as a function of readback BER.

9. The storage device of claim 6, wherein the head/media clearance parameter indicates a current input value for a reader heater, the reader heater controlling a close point between a read element and the data track.

10. One or more non-transitory computer-readable storage media encoding computer-executable instructions for executing a computer process comprising:
incrementing a counter for a data track each time an adjacent track is written;
determining a count value of the counter for the data track, the count value being indicative of a current degree of data degradation on the data track that is due to adjacent track interference (ATI);
querying a look-up table with the count value to retrieve a head/media clearance parameter; and
adjusting a fly height setting for a read operation of the data track based on the retrieved head/media clearance parameter, the fly height setting being adjusted to provide greater head-media separation when the current degree of data degradation on the data track is lower than when the current degree of data degradation on the data track is comparatively higher.

11. The one or more non-transitory computer-readable storage media of claim 10, wherein adjusting the fly height further comprises:
querying the look-up table with a radial zone of the data track.

12. The one or more non-transitory computer-readable storage media of claim 11, wherein the head/media clearance parameter indicates a current input value for a reader heater, the reader heater controlling a close point between a read element and the data track.

* * * * *